United States Patent
Tsujimoto

(10) Patent No.: US 11,705,155 B2
(45) Date of Patent: *Jul. 18, 2023

(54) MAGNETIC TAPE HAVING CHARACTERIZED PSD RATIO, MAGNETIC TAPE CARTRIDGE, AND MAGNETIC RECORDING AND REPRODUCING APPARATUS

(71) Applicant: FUJIFILM Corporation, Tokyo (JP)

(72) Inventor: Shinji Tsujimoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,158

(22) Filed: Jan. 24, 2022

(65) Prior Publication Data

US 2022/0148776 A1    May 12, 2022

Related U.S. Application Data

(63) Continuation of application No. 16/802,797, filed on Feb. 27, 2020, now Pat. No. 11,270,822.

(30) Foreign Application Priority Data

Feb. 28, 2019   (JP) ................................. 2019-036711

(51) Int. Cl.
| | |
|---|---|
| G11B 5/68 | (2006.01) |
| G11B 5/735 | (2006.01) |
| G11B 5/706 | (2006.01) |
| G11B 5/714 | (2006.01) |

(52) U.S. Cl.
CPC ............ *G11B 5/68* (2013.01); *G11B 5/70678* (2013.01); *G11B 5/714* (2013.01); *G11B 5/7356* (2019.05); *G11B 5/7358* (2019.05)

(58) Field of Classification Search
None
See application file for complete search history.

(56) References Cited

U.S. PATENT DOCUMENTS

| | | | |
|---|---|---|---|
| 11,270,822 B2* | 3/2022 | Tsujimoto | ............. G11B 5/714 |
| 2009/0134260 A1 | 5/2009 | Jensen et al. | |
| 2009/0168265 A1 | 7/2009 | Harasawa et al. | |
| 2011/0244118 A1 | 10/2011 | Lowery et al. | |
| 2015/0194174 A1 | 7/2015 | Sekiguchi et al. | |
| 2020/0279679 A1 | 9/2020 | Tsujimoto | |

FOREIGN PATENT DOCUMENTS

JP        2004-030870 A        1/2004

* cited by examiner

*Primary Examiner* — Kevin M Bernatz
(74) *Attorney, Agent, or Firm* — Sughrue Mion, PLLC

(57) ABSTRACT

The magnetic tape includes a non-magnetic support, a magnetic layer that includes ferromagnetic powder having an average particle volume of 2,500 nm$^3$ or less on one surface side of the non-magnetic support, and a back coating layer that includes non-magnetic powder on the other surface side of the non-magnetic support, in which the ferromagnetic powder is ferromagnetic powder selected from the group consisting of hexagonal ferrite powder and ε-iron oxide powder, and a ratio ($PSD_{5\mu m\text{-}PSDmag}/PSD_{10\mu m\text{-}PSDbc}$) of the magnetic layer and the back coating layer is in a range of 0.0050 to 0.20. A magnetic tape cartridge and a magnetic recording and reproducing apparatus include the magnetic tape.

16 Claims, No Drawings

MAGNETIC TAPE HAVING CHARACTERIZED PSD RATIO, MAGNETIC TAPE CARTRIDGE, AND MAGNETIC RECORDING AND REPRODUCING APPARATUS

This application is a continuation of application Ser. No. 16/802,797 filed Feb. 27, 2020, now issued as U.S. Pat. No. 11,270,822 on Mar. 8, 2022, which claims priority under 35 U.S.C 119 to Japanese Patent Application No. 2019-036711 filed on Feb. 28, 2019. The above applications are hereby expressly incorporated by reference, in their entirety, into the present application.

BACKGROUND OF THE INVENTION

1. Field of the Invention

The present invention relates to a magnetic tape, a magnetic tape cartridge, and a magnetic recording and reproducing apparatus.

2. Description of the Related Art

There are a tape-shaped magnetic recording medium and a disk-shaped magnetic recording medium, and a tape-shaped magnetic recording medium, that is, a magnetic tape is mainly used for data storage applications such as data backup and archive. For the magnetic tape, a back coating layer is provided on a surface side of a non-magnetic support opposite to a surface side provided with a magnetic layer (for example, see JP2004-030870A).

SUMMARY OF THE INVENTION

A magnetic layer of a magnetic tape includes ferromagnetic powder. In recent years, from a viewpoint of high density recording adequacy or the like, hexagonal ferrite powder and ε-iron oxide powder are attracting attention as ferromagnetic powder. Furthermore, a high recording density is always desired for the magnetic tape. As means for increasing the recording density of the magnetic tape, ferromagnetic powder having a small particle volume is used as the ferromagnetic powder included in the magnetic layer.

However, in a view of the above, the present inventor has studied a magnetic tape that includes a magnetic layer and a back coating layer, the magnetic layer including ferromagnetic powder having a small particle volume selected from the group consisting of hexagonal ferrite powder and ε-iron oxide powder, and as a result, it has become clear that improvement in recording quality and/or reproducing quality when the magnetic tape is repeatedly run (hereinafter, referred to as "recording and reproducing quality during repeated running") is desired. Recording and reproducing quality during repeated running means that, for example, in a case where data (information) is recorded on a magnetic tape after the magnetic tape is repeatedly run, recording and reproducing quality during repeated running is excellent in a case where the data can be continuously recorded stably in a longitudinal direction of the magnetic tape.

An object of an aspect of the present invention is to provide a magnetic tape that includes a magnetic layer and a back coating layer, the magnetic layer including ferromagnetic powder having a small particle volume selected from the group consisting of hexagonal ferrite powder and ε-iron oxide powder, and is excellent in recording and reproducing quality during repeated running.

An aspect of the present invention relates to a magnetic tape comprising: a non-magnetic support; a magnetic layer that includes ferromagnetic powder having an average particle volume of 2,500 nm$^3$ or less on one surface side of the non-magnetic support; and a back coating layer that includes non-magnetic powder on the other surface side of the non-magnetic support, in which the ferromagnetic powder is ferromagnetic powder selected from the group consisting of hexagonal ferrite powder and ε-iron oxide powder, and a ratio ($PSD_{5\mu m-PSDmag}/PSD_{10\mu m-PSDbc}$) of a $PSD_{5\mu m-PSDmag}$ at a 5 μm pitch on a surface of the magnetic layer and a $PSD_{10\mu m-PSDbc}$ at a 10 μm pitch on a surface of the back coating layer is in a range of 0.0050 to 0.20. A "PSD" refers to power spectrum density.

In an aspect, a ratio ($PSD_{3\mu m-PSDbc}/PSD_{10\mu m-PSDbc}$) of a $PSD_{3\mu m-PSDbc}$ at a 3 μm pitch on a surface of the back coating layer and a $PSD_{10\mu m-PSDbc}$ at a 10 μm pitch on a surface of the back coating layer may be in a range of 0.050 to 0.75.

In an aspect, a product ($Rku_{mag} \times Rku_{bc}$) of a kurtosis $Rku_{mag}$ of a surface of the magnetic layer and a kurtosis $Rku_{bc}$ of a surface of the back coating layer may be in a range of 7.0 to 20.0.

In an aspect, the kurtosis $Rku_{mag}$ of the surface of the magnetic layer and the kurtosis $Rku_{bc}$ of the surface of the back coating layer may have a relationship of $Rku_{mag} < Rku_{bc}$.

In an aspect, at least one of a skewness $Rsk_{mag}$ of a surface of the magnetic layer or a skewness $Rsk_{bc}$ of a surface of the back coating layer may be 0 or more.

In an aspect, the skewness $Rsk_{bc}$ of the surface of the back coating layer may be 0 or more.

In an aspect, the hexagonal ferrite powder may be hexagonal strontium ferrite powder.

Another aspect of the present invention relates to a magnetic tape cartridge comprising: the magnetic tape described above.

Another aspect of the present invention relates to a magnetic recording and reproducing apparatus comprising: the magnetic tape described above; and a magnetic head.

According to an aspect of the present invention, it is possible to provide a magnetic tape that includes a magnetic layer and a back coating layer, the magnetic layer including ferromagnetic powder having a small particle volume selected from the group consisting of hexagonal ferrite powder and ε-iron oxide powder, and is excellent in recording and reproducing quality during repeated running According to an aspect of the present invention, it is possible to provide a magnetic tape cartridge and a magnetic recording and reproducing apparatus which include such a magnetic tape.

DESCRIPTION OF THE PREFERRED EMBODIMENTS

Magnetic Tape

An aspect of the present invention relates to a magnetic tape comprising: a non-magnetic support; a magnetic layer that includes ferromagnetic powder having an average particle volume of 2,500 nm$^3$ or less on one surface side of the non-magnetic support; and a back coating layer that includes non-magnetic powder on the other surface side of the non-magnetic support, in which the ferromagnetic powder is ferromagnetic powder selected from the group consisting of hexagonal ferrite powder and ε-iron oxide powder, and a ratio ($PSD_{5\mu m-PSDmag}/PSD_{10\mu m-PSDbc}$) of a $PSD_{5\mu m-PSDmag}$ at a 5 μm pitch on a surface of the magnetic layer and a $PSD_{10\mu m\text{-}PSDbc}$ at a 10 µm pitch on a surface of the back coating layer is in a range of 0.0050 to 0.20.

Hereinafter, the magnetic tape will be described more specifically.

Surface Shape of Magnetic Layer and Back Coating Layer

Ratio ($PSD_{5\mu m\text{-}PSDmag}/PSD_{10\mu m\text{-}PSDbc}$)

For example, a PSD at a 10 µm pitch is obtained by the following method.

A PSD is measured using a non-contact optical interference type surface roughness machine. For example, a non-contact optical interference type surface roughness machine manufactured by Bruker Japan K.K., WYKO Corporation, or Zygo Corporation can be used. At the time of measurement, it is preferable to use an objective lens having a high magnification (for example, about 50 times). A magnification of an objective lens and an intermediate lens is set so that a sampling length is in a range of 50 nm to 300 nm, and profile data of a measurement target surface is measured.

A PSD in a longitudinal direction of the magnetic tape is calculated. The profile data in the longitudinal direction is Fourier transformed by a mounting function of the non-contact optical interference type surface roughness machine, and the averaged data is calculated as a PSD.

From this PSD, a PSD value at each wavelength is calculated to obtain a PSD value corresponding to a 10 µm pitch. The PSD value thus obtained is set as a PSD at a 10 µm pitch. The same applies to PSDs at other pitches. For specific aspects of a method of measuring the PSD, the following examples can be referred to.

The PSD obtained by the above method is a value that can serve as an indicator of an existence state of a waviness component on a surface of a measurement target layer. While the present inventor has repeatedly studied, it has been found that in a magnetic tape that includes a non-magnetic support, a magnetic layer including ferromagnetic powder having an average particle volume of 2,500 nm$^3$ or less on one surface side of the non-magnetic support, and a back coating layer including non-magnetic powder on the other surface side of the non-magnetic support, an existence state of waviness components on surfaces of the magnetic layer and the back coating layer is controlled so that a ratio ($PSD_{5\mu m\text{-}PSDmag}/PSD_{10\mu m\text{-}PSDbc}$) is in a range of 0.0050 to 0.20, and thus it becomes possible to improve recording and reproducing quality during repeated running. This point will be further described below.

The magnetic tape is usually wound around a reel of a magnetic tape cartridge and accommodated in the magnetic tape cartridge. The magnetic tape cartridge is mounted on a magnetic recording and reproducing apparatus (called a drive), and the magnetic tape is fed out from the reel of the magnetic tape cartridge in the drive or wound on the reel of the magnetic tape cartridge, whereby the magnetic tape can be run in the drive. It is considered that a winding deviation between a magnetic layer surface and a back coating layer surface during winding on the reel causes damage on the magnetic layer surface. The damage on the magnetic layer surface can cause a change in spacing between the magnetic layer surface and a magnetic head in a case where the magnetic tape and the magnetic head come into contact with each other to be slid on each other for recording data and/or reproducing the recorded data on the magnetic tape. In this regard, it is supposed that the smaller a particle volume of ferromagnetic powder included in a magnetic layer is, the smaller the number of molecules of a binding agent with respect to ferromagnetic particles constituting the ferromagnetic powder is, and therefore the magnetic layer is likely to be brittle and easily damaged. In addition, it is supposed that a magnetic layer including ε-iron oxide powder generally tends to have a high anisotropy magnetic field Hk, and therefore it is easily affected by spacing change during data recording. A magnetic layer including hexagonal strontium ferrite powder in hexagonal ferrite powder generally tends to have a high anisotropy magnetic field Hk, and therefore the same applies thereto.

With respect to this, it is considered that an existence state of waviness components on surfaces of the magnetic layer and the back coating layer is controlled so that a ratio ($PSD_{5\mu m\text{-}PSDmag}/PSD_{10\mu m\text{-}PSDbc}$) is in a range of 0.0050 to 0.20, and thus a so-called wedge effect can be exerted between the magnetic layer surface and the back coating layer surface during winding onto a reel. It is supposed that this leads to suppression of a winding deviation between the magnetic layer surface and the back coating layer surface during winding onto the reel, and it becomes possible to improve recording and reproducing quality during repeated running. However, the above is supposition and does not limit the present invention. Furthermore, the present invention is not limited to other suppositions described in this specification.

In the above magnetic tape, the ratio ($PSD_{5\mu m\text{-}PSDmag}/PSD_{10\mu m\text{-}PSDbc}$) is 0.0050 or more, and from a viewpoint of further improving the recording and reproducing quality, it is preferably 0.010 or more, more preferably 0.020 or more, and still more preferably 0.030 or more. In addition, in the above magnetic tape, the ratio ($PSD_{5\mu m\text{-}PSDmag}/PSD_{10\mu m\text{-}PSDbc}$) is 0.20 or less, and from a viewpoint of further improving the recording and reproducing quality, it is preferably 0.15 or less, more preferably 0.10 or less, still more preferably 0.080 or less, and still more preferably 0.060 or less.

In the above magnetic tape, the ratio ($PSD_{5\mu m\text{-}PSDmag}/PSD_{10\mu m\text{-}PSDbc}$) may be in the above range, a $PSD_{5\mu m\text{-}PSDmag}$ at a 5 µm pitch on a surface of the magnetic layer and a $PSD_{10\mu m\text{-}PSDbc}$ at a 10 µm pitch on a surface of the back coating layer are not limited. The $PSD_{5\mu m\text{-}PSDmag}$ at a 5 µm pitch on the surface of the magnetic layer can be, for example, 3.00 E+02 nm$^3$ or more, preferably 6.00 E+02 nm$^3$ or more, and more preferably 1.00 E+03 nm$^3$ or more. Moreover, the $PSD_{5\mu m\text{-}PSDmag}$ at a 5 µm pitch on the surface of the magnetic layer can be, for example, 1.50 E+04 nm$^3$ or less, preferably 9.00 E+03 nm$^3$ or less, and more preferably 3.00 E+03 nm$^3$ or less. The $PSD_{10\mu m\text{-}PSDbc}$ at a 10 µm pitch on the surface of the back coating layer can be, for example, 1.00 E+04 nm$^3$ or more, preferably 3.00 E+04 nm$^3$ or more, and more preferably 5.00 E+04 nm$^3$ or more. Moreover, the $PSD_{10\mu m\text{-}PSDbc}$ at a 10 µm pitch on the surface of the back coating layer can be, for example, 5.00 E+05 nm$^3$ or less, preferably 3.00 E+05 nm$^3$ or less, and more preferably 1.00 E+05 nm$^3$ or less. In an aspect, a $PSD_{10\mu m\text{-}PSDbc}$ can be in a range of 2.00 E+04 to 8.00 E+04 nm$^3$. In an aspect, a $PSD_{10\mu m\text{-}PSDmag}$ at a 10 µm pitch on the surface of the magnetic layer can be in a range of 8.00 E+02 to 1.00 E+04 nm$^3$. As is well known, "E" is an exponential notation, for example, "E+03" indicates "×10$^3$" (cube of 10).

Ratio ($PSD_{3\mu m\text{-}PSDbc}/PSD_{10\mu m\text{-}PSDbc}$)

In the above magnetic tape, from a viewpoint of further improving recording and reproducing quality during repeated running, a ratio ($PSD_{3\mu m\text{-}PSDbc}/PSD_{10\mu m\text{-}PSDbc}$) of a $PSD_{3\mu m\text{-}PSDbc}$ at a 3 µm pitch on a surface of the back coating layer and a $PSD_{10\mu m\text{-}PSDbc}$ at a 10 µm pitch on a surface of the back coating layer is preferably in a range of 0.050 to 0.75. It is considered that the ratio ($PSD_{3\mu m\text{-}PSDbc}/PSD_{10\mu m\text{-}PSDbc}$) of 0.050 or more contributes to further suppression of a winding deviation between the magnetic layer surface and the back coating layer surface during winding onto the reel. Further, the smaller ratio ($PSD_{3\mu m\text{-}PSDbc}/PSD_{10\mu m\text{-}PSDbc}$) is considered to mean that the change in roughness in a minute region on the back coating layer surface becomes smaller. It is supposed that the smaller the change in roughness is, the magnetic layer surface is less likely damaged due to the roughness of the back coating layer surface. With respect to this, it is considered that the ratio ($PSD_{3\mu m\text{-}PSDbc}/PSD_{10\mu m\text{-}PSDbc}$) of 0.75 or less leads to reduction in damage on the magnetic layer surface due to the roughness of the back coating layer. From a viewpoint of further improving the recording and reproducing quality during repeated running, the ratio ($PSD_{3\mu m\text{-}PSDbc}/PSD_{10\mu m\text{-}PSDbc}$) is more preferably 0.070 or more, still more preferably 0.10 or more, still more preferably 0.20 or more, and still more preferably 0.30 or more. From the same viewpoint, the ratio ($PSD_{3\mu m\text{-}PSDbc}/PSD_{10\mu m\text{-}PSDbc}$) is more preferably 0.70 or less, and still more preferably 0.60 or less. The $PSD_{3\mu m\text{-}PSDbc}$ at a 3 μm pitch on a surface of the back coating layer can be, for example, in a range of 1.00 E+03 to 1.00 E+05 $nm^3$.

Product ($Rku_{mag} \times Rku_{bc}$)

In the above magnetic tape, from a viewpoint of further improving the recording and reproducing quality during repeated running, a product ($Rku_{mag} \times Rku_{bc}$) of a kurtosis $Rku_{mag}$ of a surface of the magnetic layer and a kurtosis $Rku_{bc}$ of a surface of the back coating layer is preferably in a range of 7.0 to 20.0. A kurtosis Rku is a value obtained according to JIS B 0601:2013 from profile data of a surface roughness in a longitudinal direction of the magnetic tape obtained for a region having an area 167 μm×125 μm on a surface of a measurement target layer by using a non-contact optical interference type surface roughness machine. For specific aspects of a method of measuring the $Rku_{mag}$ and $Rku_{bc}$, the following examples can be referred to. The kurtosis Rku represents a sharpness of a height distribution of the surface, "Rku=3" represents that the height distribution is a normal distribution, "Rku>3" represents that the surface has many sharp irregularities, and "Rku<3" represents that the surface is flat with few sharp irregularities. It is considered that the more sharp irregularities on the magnetic layer surface and/or the back coating layer surface are, the more a so-called wedge effect can be exerted, and a winding deviation between the magnetic layer surface and the back coating layer surface during winding onto the reel can be further suppressed. From this viewpoint, the product ($Rku_{mag} \times Rku_{bc}$) is preferably 7.0 or more, more preferably 8.0 or more, and still more preferably 9.0 or more. From a viewpoint of suppressing damage to be easily generated on the magnetic layer surface and/or the back coating layer surface due to a protrusion, the product ($Rku_{mag} \times Rku_{bc}$) is preferably 20.0 or less, more preferably 18.0 or less, still more preferably 16.0 or less, still more preferably 14.0 or less, and still more preferably 12.0 or less. From a viewpoint of further suppressing damage to be easily generated on the magnetic layer surface, it is preferable that a kurtosis $Rku_{mag}$ of a surface of the magnetic layer is smaller than a kurtosis $Rku_{bc}$ of a surface of the back coating layer, that is, a relationship of $Rku_{mag} < Rku_{bc}$ is satisfied. The kurtosis $Rku_{mag}$ of a surface of the magnetic layer is preferably in a range of 2.00 to 6.00, and more preferably in a range of 2.50 to 4.00. The kurtosis $Rku_{bc}$ of a surface of the back coating layer is preferably in a range of 2.00 to 6.00, and more preferably in a range of 2.50 to 5.00.

$Rsk_{mag}$ and $Rsk_{bc}$

In the above magnetic tape, from a viewpoint of further improving the recording and reproducing quality during repeated running, at least one of a skewness $Rsk_{mag}$ of a surface of the magnetic layer or a skewness $Rsk_{bc}$ of a surface of the back coating layer is preferably 0 or more. A skewness Rsk is a value obtained according to JIS B 0601:2013 from profile data of a surface roughness in a longitudinal direction of the magnetic tape obtained for a region having an area 167 μm×125 μm on a surface of a measurement target layer by using a non-contact optical interference type surface roughness machine. For specific aspects of a method of measuring the $Rsk_{mag}$ and $Rsk_{bc}$, the following examples can be referred to. The skewness Rsk represents a symmetry of a height distribution of the surface, "Rsk=0" represents that the height distribution (vertical axis is height) is vertically symmetric, "Rsk>0" (that is, Rsk is positive value) represents that the surface has many protrusions, and "Rsk<0" (that is, Rsk is negative value) represents that the surface has many recesses. From a viewpoint of further exerting the so-called wedge effect, at least one of $Rsk_{mag}$ or $Rsk_{bc}$ is preferably 0 or more, and more preferably more than 0. $Rsk_{mag}$ can be, for example, in a range of −0.75 to 0.75 (that is, +0.75), and $Rsk_{bc}$ can be, for example, in a range of −0.50 to 1.00 (that is, +1.00). In an aspect, $Rsk_{mag}$ and $Rsk_{bc}$ can be 0 or more or more than 0. Further, from a viewpoint of high density recording, since it is preferable to reduce the protrusion on the magnetic layer surface, $Rsk_{mag}$ is preferably less than 0. $Rsk_{bc}$ can be 0 or more, more than 0, or less than 0, preferably 0 or more or more than 0, and more preferably more than 0.

The method for controlling the surface shape of the magnetic layer and the back coating layer described above will be described later.

Magnetic Layer

Ferromagnetic Powder

Average Particle Volume

The above magnetic tape includes, in a magnetic layer, ferromagnetic powder having an average particle volume of 2,500 $nm^3$ or less which is selected from the group consisting of hexagonal ferrite powder and ε-iron oxide powder. An average particle volume is a value obtained as a sphere equivalent volume, from an average particle size obtained by a method which will be described later. Ferromagnetic powder having an average particle volume of 2,500 $nm^3$ or less included in a magnetic layer is preferable from a viewpoint of improving recording density. From this viewpoint, the average particle volume is preferably 2,300 $nm^3$ or less, more preferably 2,000 $nm^3$ or less, and still more preferably 1,500 $nm^3$ or less. On the other hand, from a viewpoint of magnetization stability, the average particle volume is preferably 500 $nm^3$ or more, more preferably 600 $nm^3$ or more, still more preferably 650 $nm^3$ or more, and still more preferably 700 $nm^3$ or more. A magnetic layer of the above magnetic tape can include one or more ferromagnetic powders selected from the group consisting of hexagonal ferrite powder and ε-iron oxide powder.

Hexagonal Ferrite Powder

In an aspect, the above magnetic tape may include hexagonal ferrite powder in the magnetic layer. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and this specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and this specification, hexagonal strontium ferrite powder means that the main divalent metal atom included in the powder is a strontium atom, and the hexagonal barium ferrite powder means that the main divalent metal atom included in this powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and this specification is selected from the group consisting of a scandium atom (Sc), an yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, hexagonal strontium ferrite powder which is an aspect of the hexagonal ferrite powder will be described in more detail.

An index for reducing thermal fluctuation, in other words, improving thermal stability may include an anisotropy constant Ku. The hexagonal strontium ferrite powder may preferably have Ku of $1.8 \times 10^5$ J/m$^3$ or more, and more preferably have a Ku of $2.0 \times 10^5$ J/m$^3$ or more. Ku of the hexagonal strontium ferrite powder may be, for example, $2.5 \times 10^5$ J/m$^3$ or less. Here, it means that the higher Ku is, the higher thermal stability is, this is preferable, and thus, a value thereof is not limited to the values exemplified above. For a unit of the anisotropy constant Ku, 1 erg/cc=$1.0 \times 10^{-1}$ J/m$^3$.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and this specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content>1.0. A rare earth atom content in hexagonal strontium ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content>1.0" means that in a particle of hexagonal strontium ferrite powder, rare earth atoms are unevenly distributed in a surface layer portion (that is, more than an inside). The surface layer portion in the present invention and this specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring hexagonal strontium ferrite powder contribute to suppression of a decrease in a reproducing output in repeated reproduction. It is supposed that this is because hexagonal strontium ferrite powder includes a rare earth atom with a bulk content in the above range, and rare earth atoms are unevenly distributed in a surface layer portion of a particle configuring hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to an improvement of running durability of the magnetic tape. It is supposed that this may be because uneven distribution of rare earth atoms on a surface of a particle configuring hexagonal strontium ferrite powder contributes to an improvement of interaction between the particle surface and an organic substance (for example, a binding agent and/or an additive) included in the magnetic layer, and, as a result, a strength of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and this specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and this specification. That is, unless otherwise noted, a certain component may be used alone or in combination of two or more. A content amount or content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. A "surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and the "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example. The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 μm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproducing output in a case of reproducing information recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m$^2$/kg or more, and may be 47 A·m$^2$/kg or more. On the other hand, from a viewpoint of noise reduction, σs is preferably 80 A·m$^2$/kg or less and more preferably 60 A·m$^2$/kg or less. σs can be measured using a known measuring device, such as a vibrating sample magnetometer, capable of measuring magnetic properties. In the present invention and this specification, unless otherwise noted, the mass magnetization σs is a value measured at a magnetic field intensity of 15 kOe. 1[kOe]=$10^6/4\pi$[A/m]

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also called an "M type"), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and this specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

In a case where the magnetic tape includes hexagonal strontium ferrite powder in the magnetic layer, the anisotropy magnetic field Hk of the magnetic layer is preferably 14 kOe or more, more preferably 16 kOe or more, and still more preferably, 18 kOe or more. In addition, the anisotropy magnetic field Hk of the magnetic layer is preferably 90 kOe or less, more preferably 80 kOe or less, and still more preferably 70 kOe or less.

The anisotropy magnetic field Hk in the present invention and this specification refers to a magnetic field in which magnetization is saturated in a case where a magnetic field is applied in a magnetization hard axis direction. The anisotropy magnetic field Hk can be measured using a known measuring device, such as a vibrating sample magnetometer, capable of measuring magnetic properties. In the magnetic layer including hexagonal strontium ferrite powder, the magnetization hard axis direction of the magnetic layer is an in-plane direction.

ε-Iron Oxide Powder

In the present invention and this specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic tape is not limited to the methods described here.

An index for reducing thermal fluctuation, in other words, improving thermal stability may include an anisotropy constant Ku. The ε-iron oxide powder preferably has Ku of $3.0 \times 10^4$ J/m$^3$ or more, and more preferably has Ku of $8.0 \times 10^4$ J/m$^3$ or more. Ku of the ε-iron oxide powder may be, for example, $3.0 \times 10^5$ J/m$^3$ or less. Here, it means that the higher Ku is, the higher thermal stability is, this is preferable, and thus, a value thereof is not limited to the values exemplified above.

From a viewpoint of increasing the reproducing output in a case of reproducing information recorded on the magnetic tape, it is desirable that mass magnetization σs of the ferromagnetic powder included in the magnetic tape is high. In this regard, in an aspect, σs of the ε-iron oxide powder may be 8 A·m$^2$/kg or more, and may be 12 A·m$^2$/kg or more. On the other hand, from a viewpoint of noise reduction, σs of the ε-iron oxide powder is preferably 40 A·m$^2$/kg or less and more preferably 35 A·m$^2$/kg or less.

In a case where the magnetic tape includes ε-iron oxide powder in the magnetic layer, the anisotropy magnetic field Hk of the magnetic layer is preferably 18 kOe or more, more preferably 30 kOe or more, and still more preferably, 38 kOe or more. In addition, the anisotropy magnetic field Hk of the magnetic layer is preferably 100 kOe or less, more preferably 90 kOe or less, and still more preferably 75 kOe or less. In the magnetic layer including ε-iron oxide powder, the magnetization hard axis direction of the magnetic layer is an in-plane direction.

In the present invention and this specification, unless otherwise noted, an average particle size of various types of powder is a value measured by the following method using a transmission electron microscope.

The powder is imaged at a magnification ratio of 100,000 with a transmission electron microscope, and the image is printed on printing paper, is displayed on a display, or the like so that the total magnification ratio becomes 500,000 to obtain an image of particles configuring the powder. For powder included in a magnetic layer of a magnetic recording medium, imaging is performed by using a cut piece produced by the following method and an image of particles can be obtained. The magnetic recording medium is bonded to a resin block or the like, a cut piece is produced using a microtome or the like, the produced cutting piece is observed using a transmission electron microscope, and a magnetic layer portion is specified and imaged. For example, for a magnetic tape, the magnetic tape can be cut in a longitudinal direction to produce a cut piece.

A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted, and the average particle volume of the ferromagnetic powder is a value calculated as a sphere equivalent volume from such an average particle size. In the present invention and this specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe powder in some cases.

As a method of taking sample powder from the magnetic tape in order to measure the particle size, a method disclosed in a paragraph of 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %. The magnetic layer includes ferromagnetic powder, can include a binding agent, and can include one or more additional additives. A high filling percentage of the ferromagnetic powder in the magnetic layer is preferable from a viewpoint of improving the recording density.

Binding Agent and Curing Agent

The above magnetic tape may be a coating type magnetic tape, and may include a binding agent in the magnetic layer. The binding agent is one or more resins. As the binding agent, various resins usually used as a binding agent pf a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the non-magnetic layer and/or a back coating layer which will be described later.

For the binding agent described above, descriptions disclosed in paragraphs 0028 to 0031 of JP2010-024113A can be referred to. The content of the binding agent of the magnetic layer can be, for example, 1.0 to 30.0 parts by mass with respect to 100.0 parts by mass of the ferromagnetic powder. An average molecular weight of the resin used as the binding agent can be, for example, 10,000 or more and 200,000 or less as a weight-average molecular weight. The weight-average molecular weight of the present invention and this specification is a value obtained by performing polystyrene conversion of a value measured by gel permeation chromatography (GPC) under the following measurement conditions. The weight-average molecular weight shown in examples of a binding agent which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

In addition, a curing agent can also be used together with the resin which can be used as the binding agent. As the curing agent, in an aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent can be included in the magnetic layer in a state of being reacted (crosslinked) with other components such as the binding agent, by proceeding the curing reaction in a magnetic layer forming step. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The content of the curing agent in a magnetic layer forming composition can be, for example, 0 to 80.0 parts by mass, and can be 50.0 to 80.0 parts by mass from a viewpoint of improving a strength of the magnetic layer, with respect to 100.0 parts by mass of the binding agent.

Additive

The magnetic layer may include one or more kinds of additives, as necessary. As the additives, the curing agent described above is used as an example. In addition, examples of the additive which can be included in the magnetic layer include non-magnetic powder (for example, inorganic powder or carbon black), a lubricant, a dispersing agent, a dispersing assistant, an antibacterial agent, an antistatic agent, and an antioxidant. For example, for the lubricant, descriptions disclosed in paragraphs 0030 to 0033, 0035, and 0036 of JP2016-126817A can be referred to. The non-magnetic layer described later may include a lubricant. For the lubricant which may be included in the non-magnetic layer, descriptions disclosed in paragraphs 0030, 0031, 0034, 0035, and 0036 of JP2016-126817A can be referred to. For the dispersing agent, descriptions disclosed in paragraphs 0061 and 0071 of JP2012-133837A can be referred to. A dispersing agent may be added to a non-magnetic layer forming composition. For the dispersing agent which can be included in the non-magnetic layer forming composition, a description disclosed in a paragraph 0061 of JP2012-133837A can be referred to. As the non-magnetic powder that can be included in the magnetic layer, non-magnetic powder which can function as an abrasive, or non-magnetic powder which can function as a projection formation agent which forms projections suitably protruded from the magnetic layer surface (for example, non-magnetic colloidal particles) is used. In addition, carbon black can be contained in the magnetic layer. For example, carbon black having an average particle size of 5 to 300 nm can be used. The carbon black content of the magnetic layer can be, for example, 0.1 to 30.0 parts by mass per 100.0 parts by mass of the ferromagnetic powder. In an aspect, the surface shape of the magnetic layer can be controlled by adjusting the carbon black content of the magnetic layer. As the additive, a commercially available product can be suitably selected or manufactured by a well-known method according to the desired properties, and any amount thereof can be used. Examples of the additive that can be used to improve the dispersibility of the abrasive in the magnetic layer containing the abrasive include a dispersing agent disclosed in paragraphs 0012 to 0022 of JP2013-131285A.

The magnetic layer described above can be provided directly on a surface of the non-magnetic support or indirectly through the non-magnetic layer.

Non-Magnetic Layer

Next, the non-magnetic layer will be described. The above magnetic tape may have a magnetic layer directly on the surface of the non-magnetic support, or may have a magnetic layer on the surface of the non-magnetic support via a non-magnetic layer including non-magnetic powder. An average particle size of the non-magnetic powder is preferably in a range of 5 to 500 nm, and more preferably in a range of 10 to 200 nm. Non-magnetic powder used for the non-magnetic layer may be an inorganic powder or an organic powder. In addition, carbon black and the like can be used. Examples of the inorganic powder include powder such as metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably in a range of 50 to 90 mass % and more preferably in a range of 60 to 90 mass %.

The non-magnetic layer includes non-magnetic powder, and may include a binding agent together with the non-magnetic powder. In regards to other details of a binding agent or an additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

In the present invention and this specification, the non-magnetic layer also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

Back Coating Layer

The above magnetic tape includes a back coating layer including non-magnetic powder on a surface side of a non-magnetic support opposite to a surface side provided with a magnetic layer. Preferably, the back coating layer includes one or both of carbon black and inorganic powder.

For example, the surface shape of the back coating layer can be controlled by using non-magnetic powders having different particle sizes as the non-magnetic powder for the back coating layer. For example, the number of the above protrusions can be controlled by using carbon black having an average particle size of 15 to 50 nm (hereinafter, referred to as "fine particle carbon black".) and carbon black having an average particle size of 75 to 500 nm (hereinafter, referred to as "coarse particle carbon black".) in combination and adjusting a mixing ratio of both carbon blacks. The content of the carbon black in the back coating layer is preferably in a range of 50.0 to 200.0 parts by mass, and more preferably in a range of 75.0 to 150.0 with respect to 100.0 parts by mass of the binding agent.

The back coating layer may include one or more inorganic powders, preferably with carbon black. A mixing ratio of the inorganic powder and the carbon black is preferably 9:1 to 7:3 as inorganic powder:carbon black (mass basis). As an inorganic powder, inorganic powder having an average particle size of 80 to 250 nm and a Mohs hardness of 5 to 9 can be used, for example. As an inorganic powder, non-magnetic powder generally used for a non-magnetic layer, non-magnetic powder generally used as an abrasive for a magnetic layer, or the like can be used, among these, α-iron oxide, α-alumina, or the like is preferable. The content of the inorganic powder in the back coating layer is preferably in a range of 300.0 to 700.0 parts by mass, and more preferably in a range of 400.0 to 500.0 with respect to 100.0 parts by mass of the binding agent.

The back coating layer includes non-magnetic powder, can include a binding agent, and can also include one or more additives. In regards to the binding agent and the additive of the back coating layer, the well-known technique regarding the back coating layer can be applied, and the well-known technique regarding the treatment of the magnetic layer and/or the non-magnetic layer can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance. By using a support having a different PSD on a surface of a side on which the magnetic layer is formed and/or a surface of a side on which the back coating layer is formed, the surface shape of the magnetic layer and/or the surface shape of the back coating layer can be changed. A PSD at a 5 μm pitch on the surface of the side of the support on which the magnetic layer is formed (hereinafter, referred to as a "magnetic surface side 5 μm PSD".) can be, for example, in a range of 2.00 E+02 to 1.20 E+04 nm$^3$, and a PSD at a 10 μm pitch on the surface of the side of the support on which the back coating layer is formed (hereinafter, referred to as a "back surface side 10 μm PSD".) can be, for example, in a range of 5.00 E+02 to 3.00 E+06 nm$^3$. In a case where the support is manufactured by a well-known method, the surface shape of the support can be adjusted according to the size and the content of the non-magnetic powder contained in the support. In addition, by forming a smoothing layer on one side or both sides of the support by using a radiation curable resin, the surface shape of the surface on which the magnetic layer or the back coating layer is formed thereon can be adjusted.

Various Thicknesses

A thickness of the non-magnetic support is, for example, 3.0 to 50.0 μm, preferably 3.0 to 10.0 μm, and more preferably 3.0 to 5.0 μm.

A thickness of the magnetic layer can be optimized according to a saturation magnetization amount of the used magnetic head, a head gap length, a band of a recording signal, and the like, is generally 10 to 150 nm, and, from a viewpoint of high density recording, is preferably in the range of 20 to 120 nm and more preferably in the range of 30 to 100 nm. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 0.1 to 1.5 μm, and preferably 0.1 to 1.0 μm.

A thickness of the back coating layer is preferably 0.9 μm or less, and more preferably 0.1 to 0.7 μm.

Thicknesses of each layer of the magnetic tape and the non-magnetic support can be obtained by a well-known film thickness measurement method. As an example, a cross section of the magnetic tape in a thickness direction is exposed by known means such as an ion beam or a microtome, and then a cross section observation is performed using a scanning electron microscope in the exposed cross section, for example. In the cross section observation, various thicknesses can be obtained as a thickness obtained at one portion of the cross section, or an arithmetic average of thicknesses obtained at a plurality of portions of two or more portions, for example, two portions which are randomly extracted. In addition, the thickness of each layer may be obtained as a designed thickness calculated according to manufacturing conditions.

Manufacturing Step

A composition for forming the magnetic layer, the non-magnetic layer, and the back coating layer usually contains a solvent together with the various components described above. As a solvent, various organic solvents generally used for manufacturing a coating type magnetic recording medium can be used. The amount of the solvent in each layer forming composition is not particularly limited, and can be the same as that of each layer forming composition of a normal coating type magnetic recording medium. A step of preparing each layer forming composition can generally include at least a kneading step, a dispersing step, and a mixing step provided before and after these steps as necessary. Each step may be divided into two or more stages. Various components used for the preparation of each layer forming composition may be added at an initial stage or in a middle stage of each step. In addition, each component may be separately added in two or more steps.

In order to prepare each layer forming composition, a well-known technique can be used. In the kneading step, preferably, a kneader having a strong kneading force such as an open kneader, a continuous kneader, a pressure kneader, or an extruder is used. Details of the kneading processes are described in JP1989-106338A (JP-H01-106338A) and JP1989-079274A (JP-H01-079274A). Moreover, in order to disperse each layer forming composition, one or more kinds of dispersed beads selected from the group consisting of glass beads and other dispersed beads can be used as a dispersion medium. As such dispersed beads, zirconia beads, titania beads, and steel beads which are dispersed beads having a high specific gravity are suitable. These dispersed beads can be used by optimizing the particle diameter (bead diameter) and filling rate. As a dispersing device, a well-known dispersing device can be used. Each layer forming composition may be filtered by a well-known method, before subjecting to a coating step. The filtering can be performed by using a filter, for example. As the filter used in the filtering, a filter having a pore diameter of 0.01 to 3 μm (for example, filter made of glass fiber or filter made of polypropylene) can be used, for example. As coarse aggregates are removed by filtration, the waviness component and/or the protrusion on the surface of the magnetic layer and/or the back coating layer tends to be reduced.

The magnetic layer can be formed, for example, by directly coating the magnetic layer forming composition onto the non-magnetic support or performing multilayer coating of the magnetic layer forming composition with the non-magnetic layer forming composition in order or at the same time. The back coating layer can be formed by coating the back coating layer forming composition to a side of the non-magnetic support opposite to a side provided with the magnetic layer (or to be provided with the magnetic layer). For details of coating for forming each layer, a description disclosed in a paragraph 0051 of JP2010-024113A can be referred to.

After the coating step, various processes such as a drying process, an orientation process of the magnetic layer, and a surface smoothing process (calendering process) can be performed. For various processes, for example, well-known techniques disclosed in paragraphs 0052 to 0057 of JP2010-024113A can be referred to. For example, the surface shape of each layer can be controlled also by drying conditions (temperature and the like). In addition, for example, a coating layer of the magnetic layer forming composition can be subjected to an orientation process while the coating layer is in a wet (undried) state. For the orientation process, the various well-known technologies such as descriptions disclosed in a paragraph 0067 of JP2010-231843A can be used. For example, a vertical orientation process can be performed by a well-known method such as a method using a polar opposing magnet. In an orientation zone, a drying speed of the coating layer can be controlled depending on a temperature and a flow rate of dry air and/or a transportation speed of the magnetic tape in the orientation zone. In addition, the coating layer may be preliminarily dried before the transportation to the orientation zone. For the calendering process, in a case where a calendering condition is strengthened, the waviness component and/or irregularities on the surface of the magnetic layer and/or the back coating layer tends to be reduced. Examples of the calendering condition include a calendering pressure, a calendering temperature (a surface temperature of a calendering roll), a calendering speed, a hardness of a calendering roll, and the like. As values of the calendering pressure, the calendering temperature, and the hardness of a calendering roll are increased, the calendering process is strengthened, and as a value of the calendering speed is decreased, the calendering process is strengthened. Further, while a coating layer of a composition for forming any layer is in a wet (undried) state, the coating layer can be sheared by performing a smoothing process by a well-known method. By applying a shear force to the coating layer, the waviness component and/or the protrusion of the magnetic layer and/or the back coating layer tends to be reduced.

It is possible to form a servo pattern in the manufactured magnetic tape by a known method in order to enable tracking control of the magnetic head in the magnetic recording and reproducing apparatus, control of a running speed of the magnetic tape, and the like. The "formation of servo pattern" can also be referred to as "recording of servo signal". Hereinafter, the formation of the servo pattern will be described.

The servo pattern is usually formed along a longitudinal direction of the magnetic tape. Examples of control (servo control) types using a servo signal include a timing-based servo (TBS), an amplitude servo, and a frequency servo.

As shown in a european computer manufacturers association (ECMA)-319, a magnetic tape (generally called "LTO tape") conforming to a linear tape-open (LTO) standard employs a timing-based servo type. In this timing-based servo type, the servo pattern is formed by continuously disposing a plurality of pairs of non-parallel magnetic stripes (also referred to as "servo stripes") in a longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading element elements.

As shown in ECMA-319, information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming a servo pattern is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 µm or less, 1 to 10 µm, 10 µm or more, and the like.

Before the servo pattern is formed on the magnetic tape, the magnetic tape is usually subjected to a demagnetization (erasing) process. This erasing process can be performed by applying a uniform magnetic field to the magnetic tape using a direct current magnet or an alternating current magnet. The erasing process includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two methods. A first method is horizontal DC erasing of applying a magnetic field in one direction along a longitudinal direction of the magnetic tape. A second method is vertical DC erasing of applying a magnetic field in one direction along a thickness direction of the magnetic tape. The erasing process may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge and the magnetic tape cartridge is mounted in the magnetic recording and reproducing apparatus.

Magnetic Tape Cartridge

Another aspect of the present invention relates to a magnetic tape cartridge including the magnetic tape described above.

The details of the magnetic tape included in the above magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing apparatus for recording and/or reproducing data on the magnetic tape, the magnetic tape is pulled out of the magnetic tape cartridge to be wound around the reel on the magnetic recording and reproducing apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge. The above magnetic tape cartridge may be either a single reel type or a dual reel type magnetic tape cartridge. The above magnetic tape cartridge has only to include the magnetic tape according to an aspect of the present invention, and the well-known technology can be applied to the others.

Magnetic Recording and Reproducing Apparatus

Another aspect of the present invention relates to a magnetic recording and reproducing apparatus including the magnetic tape described above and a magnetic head.

In the present invention and this specification, the "magnetic recording and reproducing apparatus" means an apparatus capable of performing at least one of the recording of data on the magnetic tape or the reproducing of data recorded on the magnetic tape. Such an apparatus is generally called a drive. The magnetic recording and reproducing apparatus can be a sliding type magnetic recording and reproducing apparatus. The sliding type magnetic recording and reproducing apparatus is an apparatus in which the magnetic layer surface and the magnetic head come into contact with each other to be slid on each other, in a case of performing the recording of data on the magnetic tape and/or reproducing of the recorded data.

The magnetic head included in the magnetic recording and reproducing apparatus can be a recording head capable of performing the recording of data on the magnetic tape, or can be a reproducing head capable of performing the reproducing of data recorded on the magnetic tape. In addition, in an aspect, the magnetic recording and reproducing apparatus can include both of a recording head and a reproducing head as separate magnetic heads. In another aspect, the magnetic head included in the magnetic recording and reproducing apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing apparatus. For example, a magnetic head that records data and/or reproduces recorded data (hereinafter also referred to as "recording and reproducing head") can include two servo signal reading elements, and the two servo signal reading elements can read two adjacent servo bands simultaneously. One or a plurality of elements for data can be disposed between the two servo signal reading elements.

In the magnetic recording and reproducing apparatus, recording of data on the magnetic tape and/or reproducing of data recorded on the magnetic tape can be performed as the magnetic layer surface of the magnetic tape and the magnetic head come into contact with each other to be slid on each other. The magnetic recording and reproducing apparatus has only to include the magnetic tape according to an aspect of the present invention, and the well-known technology can be applied to the others.

For example, in a case of recording data and/or reproducing the recorded data, first, tracking using a servo signal is performed. That is, by causing the servo signal reading element to follow a predetermined servo track, the element for data is controlled to pass on the target data track. Displacement of the data track is performed by changing a servo track to be read by the servo signal reading element in a tape width direction.

The recording and reproducing head can also perform recording and/or reproducing with respect to other data bands. In this case, the servo signal reading element may be displaced to a predetermined servo band using the above described UDIM information, and tracking for the servo band may be started.

EXAMPLES

Hereinafter, the present invention will be described with reference to examples. Here, the present invention is not limited to aspects shown in the examples. "Parts" and "%" in the following description mean "parts by mass" and "mass %", unless otherwise noted. The following processes and evaluation were performed in the air of 23° C.±1° C., unless otherwise specified. "eq" described below is an equivalent and is a unit that cannot be converted into SI unit.

In Table 1 below, "SrFe1" and "SrFe2" represent hexagonal strontium ferrite powder, "ε-iron oxide" represents ε-iron oxide powder, and "BaFe" represents hexagonal barium ferrite powder.

An average particle volume of various ferromagnetic powders described below is a value obtained by the method described above.

An anisotropy constant Ku is a value obtained for each ferromagnetic powder by the method described above using a vibrating sample magnetometer (manufactured by Toei Industry Co., Ltd.).

A mass magnetization σs is a value measured at a magnetic field intensity of 15 kOe using a vibrating sample magnetometer (manufactured by Toei Industry Co., Ltd.).

Further, an anisotropy magnetic field Hk of the magnetic layer described below is a value measured using a vibrating sample magnetometer of a TM-VSM5050-SMS type (manufactured by Tamagawa Co., Ltd.).

Method for Manufacturing Ferromagnetic Powder

Manufacturing Method 1 of Hexagonal Strontium Ferrite Powder 1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the manufactured amorphous body was charged into an electric furnace, was heated to 635° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

An average particle volume of the hexagonal strontium ferrite powder obtained above ("SrFe1" in Table 1 described later) was a value described in Table 1 described later, an anisotropy constant Ku was $2.2 \times 10^5$ $J/m^3$, and a mass magnetization σs was 49 $A \cdot m^2/kg$.

12 mg of sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of sample powder was taken from the hexagonal strontium ferrite powder obtained above, elemental analysis of the filtrated solution obtained by completely dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro analyzer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees Manufacturing Method 2 of Hexagonal Strontium Ferrite Powder 1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed by a mixer to obtain a raw material mixture.

The obtained raw material mixture was melted in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the obtained amorphous body was charged into an electric furnace, was heated to 645° C. (crystallization temperature), and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 ml of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

An average particle volume of the obtained hexagonal strontium ferrite powder ("SrFe2" in Table 1 described later) was a value described in Table 1 described later, an anisotropy constant Ku was $2.0 \times 10^5$ J/m$^3$, and a mass magnetization σs was 50 A·m$^2$/kg.

Method of manufacturing ε-Iron Oxide Powder 8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stiffer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. Powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide (ε-$Ga_{0.58}$ $Fe_{1.42}O_3$). In addition, X-ray diffraction analysis is performed under the same condition as that described above for the manufacturing method 1 of hexagonal strontium ferrite powder, and from a peak of an X-ray diffraction pattern, it is checked that the obtained ferromagnetic powder does not include α-phase and γ-phase crystal structures, and has a single-phase and ε-phase crystal structure (ε-iron oxide type crystal structure).

An average particle volume of the obtained ε-iron oxide powder ("ε-iron oxide" in a table described later) was a value described in a table described later, an anisotropy constant Ku was $1.2 \times 10^5$ J/m$^3$, and a mass magnetization σs was 16 A·m$^2$/kg.

Example 1

List of each layer forming composition is shown below.

| List of Magnetic Layer Forming Composition | |
|---|---|
| Ferromagnetic powder (see Table 2) | 100.0 parts |
| Polyurethane resin | 17.0 parts |
| Branched side chain-containing polyester polyol/diphenylmethane diisocyanate system, —SO$_3$Na = 400 eq/ton | |
| α-Al$_2$O$_3$ (average particle size: 0.15 μm) | 5.0 parts |
| Diamond powder (average particle size: 60 nm) | 1.0 part |
| Carbon black (average particle size: 20 nm) | 1.0 part |
| Cyclohexanone | 110.0 parts |
| Methyl ethyl ketone | 100.0 parts |
| Toluene | 100.0 parts |
| Butyl stearate | 2.0 parts |
| Stearic acid | 1.0 part |

| List of Non-Magnetic Layer Forming Composition | |
|---|---|
| Non-magnetic inorganic powder: α-iron oxide<br>Average particle size: 10 nm<br>Average acicular ratio: 1.9<br>Brunauer-emmett-teller (BET) specific<br>surface area: 75 m$^2$/g | 100.0 parts |
| Carbon black (average particle size: 20 nm) | 25.0 parts |
| SO$_3$Na group-containing polyurethane resin<br>(weight-average molecular weight: 70,000,<br>SO$_3$Na group: 0.2 meq/g) | 18.0 parts |
| Stearic acid | 1.0 part |
| Cyclohexanone | 300.0 parts |
| Methyl ethyl ketone | 300.0 parts |

| List of Back Coating Layer Forming Composition | |
|---|---|
| Non-magnetic inorganic powder (α-iron oxide)<br>Surface treatment layer: Al$_2$O$_3$, SiO$_2$<br>Average particle size: 0.15 μm<br>Tap density: 0.8<br>Average acicular ratio: 7<br>BET specific surface area: 52 m$^2$/g<br>pH: 8<br>DBP oil absorption: 33 g/100 g | 85.0 parts |
| Fine particle carbon black<br>(average particle size: 16 nm) | 20.0 parts |
| Coarse particle carbon black<br>(average particle size: 370 nm) | none |
| Vinyl chloride copolymer (MR 104 manufactured by Kaneka Corporation) | 13.0 parts |
| Polyurethane resin (VYLON UR820 manufactured by Toyobo Co., Ltd.) | 6.0 parts |
| Phenylphosphonic acid | 3.0 parts |
| Alumina powder (average particle size: 0.25 μm) | 5.0 parts |
| Cyclohexanone | 140.0 parts |
| Methyl ethyl ketone | 170.0 parts |
| Butyl stearate | 2.0 parts |
| Stearic acid | 1.0 part |

Preparation of Each Layer Forming Composition

For each of the magnetic layer forming composition, the non-magnetic layer forming composition, and the back coating layer forming composition, each component was kneaded for 240 minutes by an open kneader, and then dispersed with a sand mill. The dispersion time was 720 minutes for the magnetic layer forming composition, and was 1080 minutes for each of the non-magnetic layer forming composition and the back coating layer forming composition. 4.0 parts of trifunctional low molecular weight polyisocyanate (CORONATE 3041 manufactured by Tosoh Corporation) was added to the dispersion liquid obtained as described above, the mixture was further stirred and mixed for 20 minutes, and then was filtered using a filter having a pore diameter of 0.5 μm.

Thus, a magnetic layer forming composition, a non-magnetic layer forming composition, and a back coating layer forming composition were prepared.

Manufacturing of Magnetic Tape Cartridge

The non-magnetic layer forming composition was applied onto a surface of a biaxially stretched polyethylene naphthalate support having a thickness of 4.6 μm (type: see Table 2) and dried under an environment at an atmosphere temperature of 100° C. so that a thickness after drying becomes 0.7 μm, and thus a non-magnetic layer was formed. The magnetic layer forming composition was applied onto a surface of the non-magnetic layer so that a thickness after drying becomes 60 nm, and thus a coating layer of the magnetic layer forming composition was formed. While this coating layer is in a wet (undried) state, a vertical orientation process was performed in which a magnetic field of a magnetic field intensity of 0.6 T was applied in a direction perpendicular to a surface of the coating layer. Thereafter, the coating layer was dried to form a magnetic layer. The back coating layer forming composition was applied onto the surface of the support on a side opposite to the surface provided with the non-magnetic layer and the magnetic layer and dried under an environment at an atmosphere temperature of 120° C. (drying temperature) so that a thickness after the drying becomes 0.4 μm, and thus a back coating layer was formed.

After that, a calendering process was performed using a seven-stage calender machine configured with only a metal roll, under conditions of a calendering speed of 100 m/min, a linear pressure of 350 kg/cm (1 kg/cm is 0.98 kN/m), and a calender temperature of 100° C. (a surface temperature of a calendering roll). Then, after a thermal process was performed in an environment of an atmosphere temperature of 70° C. for 24 hours, slitting was performed so as to have a width of ½ inches (1 inch is 0.0254 meters). In a state where the magnetic layer of the magnetic tape obtained by slitting was demagnetized, a servo pattern having a disposition and a shape according to an LTO Ultrium format was formed on the magnetic layer by a servo write head mounted on a commercially available servo writer. Accordingly, a magnetic tape including data bands, servo bands, and guide bands in the disposition according to the LTO Ultrium format in the magnetic layer, and including servo patterns (timing-based servo pattern) having the disposition and the shape according to the LTO Ultrium format on the servo band was obtained. The obtained magnetic tape was wound on a reel of a magnetic tape cartridge (LTO Ultrium 7 data cartridge) to produce a single reel type magnetic tape cartridge of Example 1 in which a magnetic tape having a length of 950 m was wound around the reel.

Examples 2 to 7 and Comparative Examples 1 to 4

A magnetic tape cartridge was manufactured in the same manner as in Example 1 except that the type of the ferromagnetic powder of the magnetic layer and/or the type of the non-magnetic support was changed as shown in Table 2.

Examples 8 to 11

A magnetic tape cartridge was manufactured in the same manner as in Example 1 except that the content and/or the type of carbon black of the back coating layer was changed as shown in Table 3.

Examples 12 to 16

A magnetic tape cartridge was manufactured in the same manner as in Example 1, except that the drying time and/or the calendering temperature after application of the back coating layer forming composition was changed as shown in Table 4.

Examples 17 to 19

A magnetic tape cartridge was manufactured in the same manner as in Example 1 except that the content of carbon black of the magnetic layer forming composition and/or the dispersion time of the back coating layer forming composition was changed as shown in Table 5.

Example 20

A magnetic tape cartridge was manufactured in the same manner as in Example 1 except that the ferromagnetic powder of the magnetic layer forming composition was changed to the hexagonal barium ferrite powder shown in Table 5.

Evaluation Method (1) Various PSDs on Surface of Magnetic Layer and Surface of Back Coating Layer Measurement was performed under the conditions shown in Table 1 using a non-contact optical roughness measuring instrument, and a $PSD_{5\mu m\text{-}PSDmag}$, a $PSD_{10\mu m\text{-}PSDbc}$, a $PSD_{3\mu m\text{-}PSDbc}$, and a $PSD_{10\mu m\text{-}PSDbc}$ described in the table which will be described later were obtained. The PSD of the support shown in the table which will be described later is a value obtained in the same manner for a measurement sample obtained from a support original material cut out from the support used for manufacturing the magnetic tape. Regarding the calculation of PSD at a specific pitch, for example, in obtaining a PSD of 10 μm, in a case where the obtained measurement results have, for example, only points of 9.9 μm and 10.3 μm, an arithmetic average of the measurement values at the point of 10 μm by rounding off the first decimal place is to be adopted.

TABLE 1

| | |
|---|---|
| Non-contact optical roughness measuring instrument | Conter GT-I manufactured by Bruker Japan K.K. |
| Objective lens | ×50 |
| Intermediate lens | ×0.55 |
| Measurement area | 167 μm × 125 μm |
| Distortion correction | Cylinder and Tilt |
| Sampling length | 130 nm |
| Data analysis software | Vision64 |
| Correction | Measurement is performed after accuracy confirmation using below standard. Step Height Standard (Model SHS-1.8 QC) manufactured by VLSI Standards, Inc. SiC Reference Flat manufactured by Zygo Corporation |
| Measurement direction | Tape longitudinal direction is measured length of 167 μm. |
| PSD calculation direction | PSD in tape longitudinal direction is calculated. |
| Sample sticking method | Magnetic tape is placed on glass plate, and four corners of magnetic tape are stuck by adhesive tape so that no slack is visually checked. |
| Measurement position and number of measurements | Width direction position: Central portion in tape width direction Longitudinal direction position: Magnetic tape is taken from magnetic tape cartridge, and measurement is performed 5 times at each of three positions of 50 m, 450 m, and 900 m from outermost outer end opposite to inner end wound around reel of magnetic tape cartridge. From measurement results obtained at three measurement positions, PSD is arithmetic average of measurement values (therefore, three measurement values for one measurement position, nine measurement values in total for three measurement positions) excluding minimum value and maximum value among PSDs obtained by five measurements at each measurement position. |

(2) Kurtosis and Skewness of Surface of Magnetic Layer and Surface of Back Coating Layer A kurtosis $Rku_{mag}$, a kurtosis $Rku_{bc}$, a skewness $Rsk_{mag}$, and a skewness $Rsk_{bc}$ shown in the table which will be described later are values obtained according to JIS B 0601:2013 from the measurement results obtained by measurement under the conditions shown in Table 1 above. The number of measurements was the same as described in Table 1, and an arithmetic average of a total of nine measurement values was adopted.

(3) Evaluation of Recording and Reproducing Quality During Repeated Running

Each magnetic tape cartridge of the examples and the comparative examples shown in Table 2 was mounted on an LTO Ultrium 7 (LTO 7) drive, the entire length of the magnetic tape was reciprocated 10,000 times with the LTO 7 drive, and then it is confirmed whether specified capacity recording could be possible. A specified capacity is 6.0 TB (terabytes). A case where the specified capacity recording could be possible without an error during recording was evaluated as "OK", and a case where the specified capacity recording could not be possible because the drive stopped due to an error signal was evaluated as "NG".

Further, a central portion in a longitudinal direction of the tape (400 to 500 m from the outer end of the tape) after the above evaluation with LTO 7 drive was cut out, and the magnetic layer surface was observed with a differential interference microscope (observation region: 2.0 mm×1.5 mm). A case where no damage is observed on the surface was evaluated as "AA", a case of 1 or 2 damages was evaluated as "A", a case of 3 or 4 damages was evaluated as "B", a case of 5 to 9 damages was evaluated as "C", and a case of 10 or more damages was evaluated as "D".

Evaluation results shown in Tables 3 to 5 are evaluation results after increasing the number of reciprocating runs to 20,000 times.

TABLE 2

|  |  | Example 1 | Example 2 | Example 3 | Example 4 | Example 5 | Example 6 |
|---|---|---|---|---|---|---|---|
| Ferromagnetic powder | Type | SrFe1 | SrFe1 | SrFe1 | SrFe1 | SrFe1 | SrFe2 |
|  | Average particle volume (nm$^3$) | 900 | 900 | 900 | 900 | 900 | 1100 |
| Non-magnetic support | Type | a | b | c | d | e | a |
|  | Magnetic surface side 5 μm PSD (nm$^3$) | 1.82E+03 | 3.10E+02 | 1.89E+03 | 1.77E+03 | 1.02E+04 | 1.82E+03 |
|  | Back surface side 10 μm PSD (nm$^3$) | 3.64E+04 | 3.56E+04 | 1.58E+06 | 7.50E+02 | 3.69E+04 | 3.64E+04 |
| Magnetic layer | Hk (kOe) | 25 | 25 | 25 | 25 | 25 | 19 |
| PSD | Ratio (PSD$_{5\mu m\text{-}PSDmag}$/PSD$_{10\mu m\text{-}PSDbc}$) | 0.033 | 0.0052 | 0.0053 | 0.19 | 0.20 | 0.038 |
|  | Magnetic layer PSD$_{5\mu m\text{-}PSDmag}$ | 2.48E+03 | 3.96E+02 | 2.21E+03 | 2.31E+03 | 1.42E+04 | 2.62E+03 |
|  | Back coating layer PSD$_{10\mu m\text{-}PSDbc}$ | 7.52E+04 | 7.62E+04 | 4.17E+05 | 1.22E+04 | 7.10E+04 | 6.89E+04 |
| Evaluation | Number of damages | AA | C | B | B | C | A |
|  | Recording and reproducing quality during repeated running | OK | OK | OK | OK | OK | OK |

|  |  | Example 7 | Comparative Example 1 | Comparative Example 2 | Comparative Example 3 | Comparative Example 4 |
|---|---|---|---|---|---|---|
| Ferromagnetic powder | Type | ε-Iron oxide | SrFe1 | SrFe1 | SrFe1 | SrFe1 |
|  | Average particle volume (nm$^3$) | 750 | 900 | 900 | 900 | 900 |
| Non-magnetic support | Type | a | g | f | h | i |
|  | Magnetic surface side 5 μm PSD (nm$^3$) | 1.82E+03 | 1.43E+02 | 1.80E+03 | 1.75E+03 | 1.48E+04 |
|  | Back surface side 10 μm PSD (nm$^3$) | 3.64E+04 | 3.61E+04 | 4.07E+06 | 3.20E+02 | 3.56E+04 |
| Magnetic layer | Hk (kOe) | 30 | 25 | 25 | 25 | 25 |
| PSD | Ratio (PSD$_{5\mu m\text{-}PSDmag}$/PSD$_{10\mu m\text{-}PSDbc}$) | 0.036 | 0.0038 | 0.0042 | 0.23 | 0.22 |
|  | Magnetic layer PSD$_{5\mu m\text{-}PSDmag}$ | 2.50E+03 | 2.69E+02 | 2.49E+03 | 2.00E+03 | 1.67E+04 |
|  | Back coating layer PSD$_{10\mu m\text{-}PSDbc}$ | 6.94E+04 | 7.07E+04 | 5.93E+05 | 8.70E+03 | 7.59E+04 |
| Evaluation | Number of damages | A | D | D | D | D |
|  | Recording and reproducing quality during repeated running | OK | NG | NG | NG | NG |

TABLE 3

|  |  | Example 1 | Example 8 | Example 9 | Example 10 | Example 11 |
|---|---|---|---|---|---|---|
| Ferromagnetic powder | Type | SrFe1 | SrFe1 | SrFe1 | SrFe1 | SrFe1 |
|  | Average particle volume (nm$^3$) | 900 | 900 | 900 | 900 | 900 |
| Content of carbon black of back coating layer (part) | Fine particle carbon black (average particle size of 16 nm) | 20.0 | 12.0 | 8.0 | 20.0 | 20.0 |
|  | Coarse particle carbon black (average particle size of 370 nm) | 0 | 0 | 0 | 2.0 | 4.0 |
| Non-magnetic support | Type | a | a | a | a | a |
|  | Magnetic surface side 5 μm PSD (nm$^3$) | 1.82E+03 | 1.82E+03 | 1.82E+03 | 1.82E+03 | 1.82E+03 |
|  | Back surface side 10 μm PSD (nm$^3$) | 3.64E+04 | 3.64E+04 | 3.64E+04 | 3.64E+04 | 3.64E+04 |
| Magnetic layer | Hk (kOe) | 25 | 25 | 25 | 25 | 25 |
| PSD | Ratio (PSD$_{5\mu m\text{-}PSDmag}$/PSD$_{10\mu m\text{-}PSDbc}$) | 0.033 | 0.029 | 0.029 | 0.043 | 0.043 |
|  | Ratio (PSD$_{3\mu m\text{-}PSDmag}$/PSD$_{10\mu m\text{-}PSDbc}$) | 0.46 | 0.053 | 0.046 | 0.72 | 0.78 |
|  | Magnetic layer PSD$_{5\mu m\text{-}PSDmag}$ | 2.48E+03 | 2.20E+03 | 2.19E+03 | 2.42E+03 | 2.47E+03 |
|  | Back coating layer PSD$_{10\mu m\text{-}PSDbc}$ | 7.52E+04 | 7.59E+04 | 7.55E+04 | 5.63E+04 | 5.74E+04 |
|  | Back coating layer PSD$_{3\mu m\text{-}PSDbc}$ | 3.46E+04 | 4.02E+03 | 3.47E+03 | 4.05E+04 | 4.48E+04 |
| Evaluation | Number of damages | AA | B | C | B | C |
|  | Recording and reproducing quality during repeated running | OK | OK | OK | OK | OK |

TABLE 4

|  |  | Example 1 | Example 12 | Example 13 | Example 14 | Example 15 | Example 16 |
|---|---|---|---|---|---|---|---|
| Ferromagnetic powder | Type | SrFe1 | SrFe1 | SrFe1 | SrFe1 | SrFe1 | SrFe1 |
|  | Average particle volume (nm$^3$) | 900 | 900 | 900 | 900 | 900 | 900 |
| Content of carbon black of back coating layer (part) | Fine particle carbon black (average particle size of 16 nm) | 20.0 | 20.0 | 20.0 | 20.0 | 20.0 | 20.0 |
|  | Coarse particle carbon black (average particle size of 370 nm) | 0 | 0 | 0 | 0 | 0 | 0 |
| Non-magnetic support | Type | a | a | a | a | a | a |
|  | Magnetic surface side 5 μm PSD (nm$^3$) | 1.82E+03 | 1.82E+03 | 1.82E+03 | 1.82E+03 | 1.82E+03 | 1.82E+03 |
|  | Back surface side 10 μm PSD (nm$^3$) | 3.64E+04 | 3.64E+04 | 3.64E+04 | 3.64E+04 | 3.64E+04 | 3.64E+04 |
| Calendering temperature (° C.) |  | 100 | 110 | 120 | 80 | 70 | 100 |
| Drying temperature of back coating layer forming composition (° C.) |  | 120 | 120 | 120 | 120 | 120 | 90 |
| Magnetic layer | Hk(kOe) | 25 | 25 | 25 | 25 | 25 | 25 |
| PSD | Ratio ($PSD_{5\mu m-PSDmag}/PSD_{10\mu m-PSDbc}$) | 0.033 | 0.028 | 0.027 | 0.031 | 0.031 | 0.033 |
|  | Ratio ($PSD_{3\mu m-PSDmag}/PSD_{10\mu m-PSDbc}$) | 0.46 | 0.42 | 0.41 | 0.45 | 0.45 | 0.46 |
|  | Magnetic layer $PSD_{5\mu m-PSDmag}$ | 2.48E+03 | 1.98E+03 | 1.88E+03 | 2.98E+03 | 2.98E+03 | 2.48E+03 |
|  | Back coating layer $PSD_{10\mu m-PSDbc}$ | 7.52E+04 | 7.12E+04 | 7.02E+04 | 9.61E+04 | 9.61E+04 | 7.52E+04 |
|  | Back coating layer $PSD_{3\mu m-PSDbc}$ | 3.46E+04 | 2.99E+04 | 2.88E+04 | 4.33E+04 | 4.33E+04 | 3.46E+04 |
| Kurtosis | Product ($Rku_{mag} \times Rku_{bc}$) | 10.7 | 7.2 | 6.8 | 19.6 | 20.3 | 9.0 |
|  | Magnetic layer $Rku_{mag}$ | 3.03 | 2.63 | 2.53 | 3.94 | 3.94 | 3.10 |
|  | Back coating layer $Rku_{bc}$ | 3.53 | 2.72 | 2.67 | 4.97 | 5.14 | 2.91 |
| Evaluation | Number of damages | AA | A | B | A | B | B |
|  | Recording and reproducing quality during repeated running | OK | OK | OK | OK | OK | OK |

TABLE 5

|  |  | Example 1 | Example 17 | Example 18 | Example 19 | Example 20 |
|---|---|---|---|---|---|---|
| Ferromagnetic powder | Type | SrFe1 | SrFe1 | SrFe1 | SrFe1 | SrFe1 |
|  | Average particle volume (nm$^3$) | 900 | 900 | 900 | 900 | 1100 |
| Content of carbon black of magnetic layer (part) |  | 1.0 | 0.2 | 1.0 | 0.2 | 1.0 |
| Content of carbon black of back coating layer (part) | Fine particle carbon black (average particle size of 16 nm) | 20 | 20 | 20 | 20 | 20 |
|  | Coarse particle carbon black (average particle size of 370 nm) | 0 | 0 | 0 | 0 | 0 |
| Dispersion time of back coating layer forming composition (minute) |  | 1080 | 1080 | 2160 | 2160 | 1080 |
| Non-magnetic support | Type | a | a | a | a | a |
|  | Magnetic surface side 5 μm PSD (nm$^3$) | 1.82E+03 | 1.82E+03 | 1.82E+03 | 1.82E+03 | 1.82E+03 |
|  | Back surface side 10 μm PSD (nm$^3$) | 3.64E+04 | 3.64E+04 | 3.64E+04 | 3.64E+04 | 3.64E+04 |
| Calendering temperature (° C.) |  | 100 | 100 | 100 | 100 | 100 |
| Drying temperature of back coating layer forming composition (° C.) |  | 120 | 120 | 120 | 120 | 120 |
| Magnetic layer | Hk (kOe) | 25 | 25 | 25 | 25 | 13 |
| PSD | Ratio ($PSD_{5\mu m-PSDmag}/PSD_{10\mu m-PSDbc}$) | 0.033 | 0.029 | 0.035 | 0.031 | 0.032 |
|  | Ratio ($PSD_{3\mu m-PSDmag}/PSD_{10\mu m-PSDbc}$) | 0.46 | 0.41 | 0.39 | 0.38 | 0.47 |
|  | Magnetic layer $PSD_{5\mu m-PSDmag}$ | 2.48E+03 | 2.28E+03 | 2.38E+03 | 2.17E+03 | 2.25E+03 |
|  | Back coating layer $PSD_{10\mu m-PSDbc}$ | 7.52E+04 | 7.86E+04 | 6.80E+04 | 7.00E+04 | 7.03E+04 |
|  | Back coating layer $PSD_{3\mu m-PSDbc}$ | 3.46E+04 | 3.22E+04 | 2.65E+04 | 2.66E+04 | 3.30E+04 |
| Kurtosis | Product ($Rku_{mag} \times Rku_{bc}$) | 10.7 | 10.0 | 10.7 | 10.0 | 11.0 |
|  | Magnetic layer $Rku_{mag}$ | 3.03 | 3.01 | 3.03 | 3.01 | 3.21 |
|  | Back coating layer $Rku_{bc}$ | 3.53 | 3.33 | 3.53 | 3.33 | 3.44 |
| Skewness | Magnetic layer $Rsk_{mag}$ | 0.18 | −0.22 | 0.23 | −0.24 | 0.21 |
|  | Back coating layer $Rsk_{bc}$ | 0.48 | 0.44 | −0.33 | −0.35 | 0.44 |
| Evaluation | Number of damages | AA | AA | B | B | AA |
|  | Recording and reproducing quality during repeated running | OK | OK | OK | OK | OK |

From the results shown in Tables 2 to 5, it can be confirmed that Examples 1 to 20 are excellent in recording and reproducing quality during repeated running as compared with Comparative Examples 1 to 4.

The same evaluation was performed in a case where ferromagnetic powders of Comparative Examples 1 to 4 were changed to the same ferromagnetic powder as ferromagnetic powder (ε-iron oxide powder) used in Example 7 and the like, and as a result, the specified capacity recording could not be possible because the drive stopped due to an error signal (evaluation result NG).

With respect to this, the same evaluation was performed in a case where ferromagnetic powders of Comparative Examples 1 to 4 were changed to the same ferromagnetic powder as ferromagnetic powder (hexagonal barium ferrite powder) used in Example 20, and as a result, the specified capacity recording could be possible, but an error occurred during recording.

It is considered that the above results show that deterioration of recording and reproducing quality during repeated running tends to be manifested in a case where ferromagnetic powder selected from the group consisting of hexagonal strontium ferrite powder and ε-iron oxide powder was used as ferromagnetic powder of a magnetic layer. With respect to this, such deterioration of recording and reproducing quality during repeated running could be suppressed in Examples 1 to 19 as shown in the above tables.

An aspect of the present invention is effective in a technical field of a magnetic tape for high-density recording.

What is claimed is:

1. A magnetic tape comprising:
a non-magnetic support;
a magnetic layer that includes ferromagnetic powder above one surface side of the non-magnetic support;
a non-magnetic layer that includes non-magnetic powder between the magnetic layer and the non-magnetic support; and
a back coating layer that includes non-magnetic powder on the other surface side of the non-magnetic support,
wherein the ferromagnetic powder is ferromagnetic powder selected from the group consisting of hexagonal ferrite powder and ε-iron oxide powder,
a thickness of the non-magnetic layer is 0.1 to 1.0 μm,
a ratio $PSD_{5\mu m\text{-}PSDmag}/PSD_{10\mu m\text{-}PSDbc}$ of a $PSD_{5\mu m\text{-}PSDmag}$ at a 5 μm pitch on a surface of the magnetic layer and a $PSD_{10\mu m\text{-}PSDbc}$ at a 10 μm pitch on a surface of the back coating layer is in a range of 0.0052 to 0.20, and
the PSD or power spectrum density at a given pitch in microns is obtained by:
measuring profile data of a measurement target surface using a non-contact optical interference type surface roughness machine, the target surface being either the magnetic layer or the back coating layer;
calculating a PSD in a longitudinal direction of the magnetic tape;
employing a mounting function of the machine to carry out a Fourier transformation of the profile data in the longitudinal direction, and calculate a PSD; and
from this PSD, calculating a PSD value at each wavelength to obtain a PSD value corresponding to the given pitch in microns.

2. The magnetic tape according to claim 1,
wherein a ratio $PSD_{3\mu m\text{-}PSDbc}/PSD_{10\mu m\text{-}PSDbc}$ of a $PSD_{3\mu m\text{-}PSDbc}$ at a 3 μm pitch on a surface of the back coating layer and a $PSD_{10\mu m\text{-}PSDbc}$ at a 10 μm pitch on a surface of the back coating layer is in a range of 0.050 to 0.75.

3. The magnetic tape according to claim 1,
wherein a product $Rku_{mag} \times Rku_{bc}$ of a kurtosis $Rku_{mag}$ of a surface of the magnetic layer and a kurtosis $Rku_{bc}$ of a surface of the back coating layer is in a range of 7.0 to 20.0, and the kurtosis Rku is a value obtained according to JIS B 0601:2013 from profile data of a surface roughness in a longitudinal direction of the magnetic tape obtained for a region having an area 167 μm×125 μm on a surface of a measurement target layer by using a non-contact optical interference type surface roughness machine.

4. The magnetic tape according to claim 3,
wherein the kurtosis $Rku_{mag}$ of the surface of the magnetic layer and the kurtosis $Rku_{bc}$ of the surface of the back coating layer have a relationship of $Rku_{mag} < Rku_{bc}$.

5. The magnetic tape according to claim 1,
wherein at least one of a skewness $Rsk_{mag}$ of a surface of the magnetic layer or a skewness $Rsk_{bc}$ of a surface of the back coating layer is 0 or more.

6. The magnetic tape according to claim 5,
wherein the skewness $Rsk_{bc}$ of the surface of the back coating layer is 0 or more.

7. The magnetic tape according to claim 1,
wherein the hexagonal ferrite powder is hexagonal strontium ferrite powder.

8. The magnetic tape according to claim 1,
wherein the thickness of the non-magnetic layer is 0.1 to 0.7 μm.

9. A magnetic tape cartridge comprising:
the magnetic tape according to claim 1.

10. The magnetic tape cartridge according to claim 9,
wherein a ratio $PSD_{3\mu m\text{-}PSDbc}/PSD_{10\mu m\text{-}PSDbc}$ of a $PSD_{3\mu m\text{-}PSDbc}$ at a 3 μm pitch on a surface of the back coating layer and a $PSD_{10\mu m\text{-}PSDbc}$ at a 10 μm pitch on a surface of the back coating layer is in a range of 0.050 to 0.75.

11. The magnetic tape cartridge according to claim 9,
wherein a product $Rku_{mag} \times Rku_{bc}$ of a kurtosis $Rku_{mag}$ of a surface of the magnetic layer and a kurtosis $Rku_{bc}$ of a surface of the back coating layer is in a range of 7.0 to 20.0, and the kurtosis Rku is a value obtained according to JIS B 0601:2013 from profile data of a surface roughness in a longitudinal direction of the magnetic tape obtained for a region having an area 167 μm×125 μm on a surface of a measurement target layer by using a non-contact optical interference type surface roughness machine.

12. The magnetic tape cartridge according to claim 11,
wherein the kurtosis $Rku_{mag}$ of the surface of the magnetic layer and the kurtosis $Rku_{bc}$ of the surface of the back coating layer have a relationship of $Rku_{mag} < Rku_{bc}$.

13. The magnetic tape cartridge according to claim 9,
wherein at least one of a skewness $Rsk_{mag}$ of a surface of the magnetic layer or a skewness $Rsk_{bc}$ of a surface of the back coating layer is 0 or more, and the skewness Rsk is a value obtained according to JIS B 0601:2013 from profile data of a surface roughness in a longitudinal direction of the magnetic tape obtained for a region having an area 167 μm×125 μm on a surface of a measurement target layer by using a non-contact optical interference type surface roughness machine.

14. The magnetic tape cartridge according to claim 13,
wherein the skewness $Rsk_{bc}$ of the surface of the back coating layer is 0 or more.

15. The magnetic tape cartridge according to claim 9,
wherein the hexagonal ferrite powder is hexagonal strontium ferrite powder.

16. The magnetic tape cartridge according to claim 9,
wherein the thickness of the non-magnetic layer is 0.1 to 0.7 μm.

* * * * *